United States Patent
Factor et al.

(10) Patent No.: US 9,613,038 B2
(45) Date of Patent: Apr. 4, 2017

(54) DIGITAL DATA RETENTION MANAGEMENT

(71) Applicant: International Business Machines Corporation, Armonk, NY (US)

(72) Inventors: Michael E. Factor, Haifa (IL); Bernhard Kurtz, Nufringen (DE); David Lebutsch, Tiebingen (DE); Cataldo Mega, Tuebingen (DE); Alexandra Shulman-Peleg, Givaraim (IL); Tim Waizenegger, Sttugart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 14/464,855

(22) Filed: Aug. 21, 2014

(65) Prior Publication Data

US 2015/0134619 A1    May 14, 2015

(30) Foreign Application Priority Data

Nov. 8, 2013    (GB) .................................. 1319723.1

(51) Int. Cl.
G06F 17/30    (2006.01)
G06F 21/62    (2013.01)

(52) U.S. Cl.
CPC .... *G06F 17/30085* (2013.01); *G06F 17/3012* (2013.01); *G06F 17/30117* (2013.01); *G06F 21/6209* (2013.01)

(58) Field of Classification Search
CPC combination set(s) only.
See application file for complete search history.

(56) References Cited

U.S. PATENT DOCUMENTS

| | | |
|---|---|---|
| 7,107,416 B2 | 9/2006 | Stuart et al. |
| 7,590,807 B2 | 9/2009 | McGovern et al. |
| 7,720,825 B2 | 5/2010 | Pelletier et al. |
| (Continued) | | |

OTHER PUBLICATIONS

International Search Report for Application No. GB1319723.1 dated Apr. 23, 2014; 4 pages.

(Continued)

*Primary Examiner* — Etienne Leroux
(74) *Attorney, Agent, or Firm* — Cantor Colburn LLP

(57) ABSTRACT

Embodiments relate to digital data retention management. An aspect includes calculating a retention date associated with a data object in a storage system. Another aspect includes generating a cryptographic checksum for metadata relating to said data object, the metadata comprising the retention date. Another aspect includes storing said metadata and said cryptographic checksum. Another aspect includes, based on receiving a request to perform a deletion transaction on said data object for deleting said data object from the storage system: verifying metadata validity by checking the cryptographic checksum for the metadata associated with said data object to detect possible tampering of the metadata; verifying retention expiration by determining that a current date is past the retention date comprised in said metadata; and based on successful verification of metadata validity and retention expiration, authorizing deletion of said data object by the storage system.

20 Claims, 5 Drawing Sheets

(56) References Cited

U.S. PATENT DOCUMENTS

| | | | |
|---|---|---|---|
| 7,895,165 B2 | 2/2011 | Cannon et al. | |
| 8,086,578 B2 | 12/2011 | Gosnell | |
| 2003/0236992 A1* | 12/2003 | Yami | G06F 21/552 726/23 |
| 2005/0097260 A1 | 5/2005 | McGovern et al. | |
| 2005/0160481 A1 | 7/2005 | Todd et al. | |
| 2006/0155652 A1* | 7/2006 | Colby | G06F 21/10 705/59 |
| 2007/0260594 A1* | 11/2007 | Lewak | G06F 17/30389 |
| 2007/0282951 A1* | 12/2007 | Selimis | H04L 67/06 709/205 |
| 2007/0288768 A1* | 12/2007 | Nesta | G06F 21/6209 713/194 |
| 2008/0091958 A1* | 4/2008 | Everett | G06F 21/51 713/194 |
| 2010/0161561 A1* | 6/2010 | Moore | G06F 17/30091 707/661 |
| 2011/0167221 A1* | 7/2011 | Pangal | G06F 11/1453 711/117 |
| 2011/0197088 A1 | 8/2011 | Kumar et al. | |
| 2011/0225361 A1* | 9/2011 | Resch | G06F 12/0646 711/114 |
| 2012/0221811 A1 | 8/2012 | Sparkes et al. | |
| 2013/0024429 A1 | 1/2013 | Raas | |
| 2013/0103945 A1 | 4/2013 | Cannon et al. | |

OTHER PUBLICATIONS

J. Jang-Jaccard, et al., "Portable Key Management Service for Cloud Storage," Collaboratecom Oct. 14-17, 2012, Pittsburg, United States; pp. 1-10.

S. Alshehri, et al., "Designing a Secure Cloud-Based EHR System Using Ciphertext-Policy Attribute-Based Encryption," Pro. DMC, 2012; pp. 1-5.

S. Yu, et al. "Achieving Secure, Scalable, and Fine-Grained Data Access Control in Cloud Computing," IEEE INFOCOM 2010 proceedings; pp. 1-9.

* cited by examiner

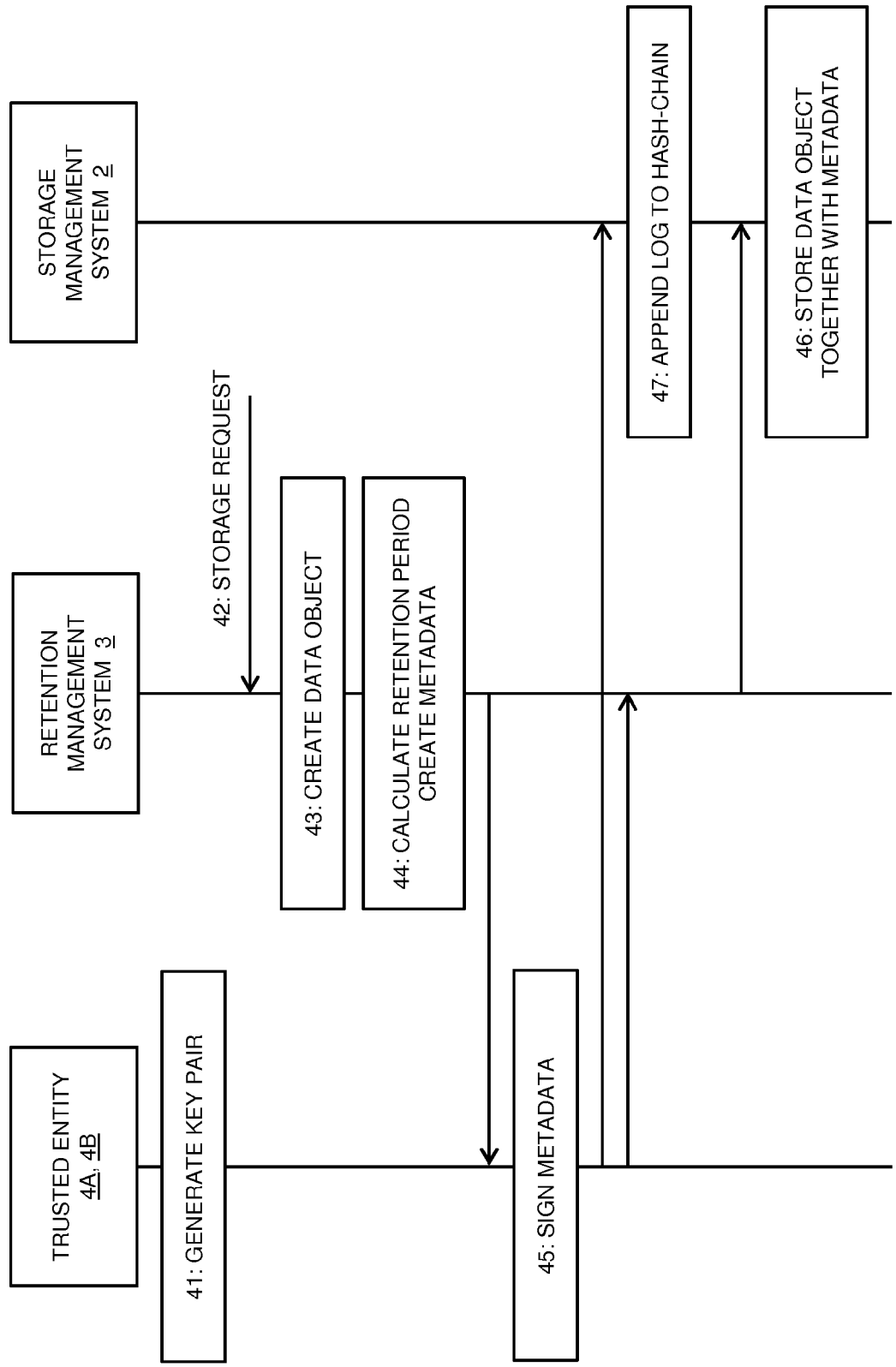

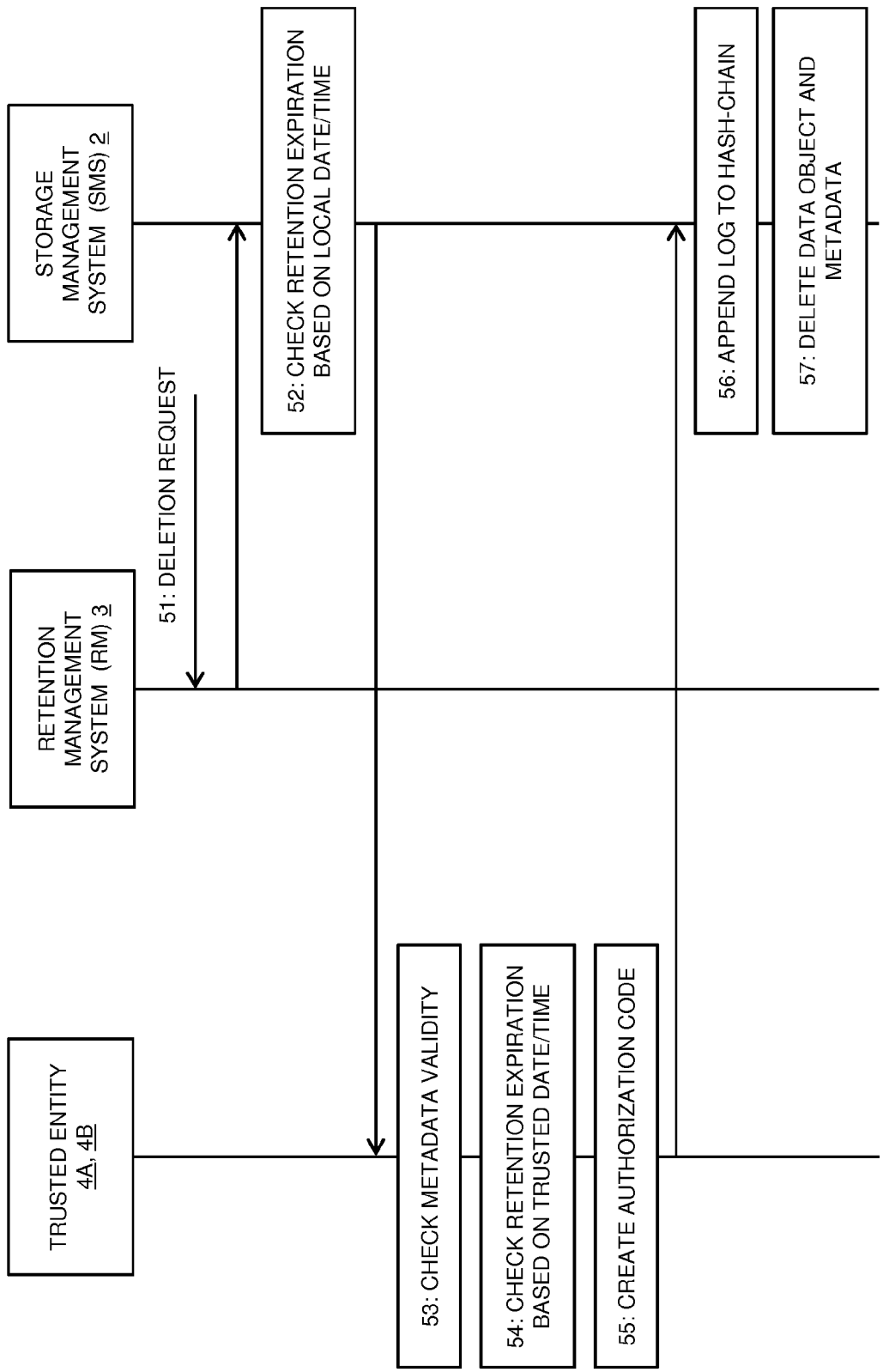

DIGITAL DATA RETENTION MANAGEMENT

PRIORITY

This application claims priority to Great Britain Patent Application No. GB 1319723.1, filed Nov. 8, 2013, and all the benefits accruing therefrom under 35 U.S.C. §119, the contents of which in its entirety are herein incorporated by reference.

BACKGROUND

The present disclosure relates generally to computer science, and more particularly relates to a data processing and storage apparatus, a method for operating a data processing and storage apparatus and computer executable instructions on a computer-readable non-transitory storage medium for retention management on digitally stored data objects.

In business and legal practice the secure management of a retention date for a business record may become very important. The retention date denotes the end of the period a certain document or similar embodiment of information has to be kept available for retrieval. After expiration of the retention period the respective item may be deleted. In the world of digital storage, the retention data of a data record is commonly understood as a metadata associated thereto and preventing the storage system from fulfilling any request for deletion of the record before the retention date has been reached. An example might be digitally stored tax receipts which need to be kept for many years by law. To meet the requirements of the law the records have to be stored in a system that honors the retention date of the records and prevents the premature expunging of the record. Not sufficiently keeping the records as required by law can lead to legal consequences but also business consequences, e.g. loss of a copy of a signed contract. Therefore, retention management has to be protected from being tampered with or becoming corrupted by hazard.

Known solutions to the record's protection problem can be relatively easily bypassed or "hacked". Simple examples of tampering are modifying the retention date in a database where retention dates are usually kept. As another simple but effective measure is "fast forwarding" the time on a system clock that can be done by a single operating system administrator thereby causing lots of documents and records becoming irrevocably destroyed. The same damage will result from an unintentionally wrong setting of the system time.

Especially in the context of cloud computing the control and protection of records has become more challenging as more and more system and solution components of a system managing retention are not controlled by the owner of a record but the cloud provider. Relatively strong protection is required that can work for a solution providing retention management in a cloud context.

SUMMARY

Embodiments relate to digital data retention management. An aspect includes calculating a retention date associated with a data object in a storage system. Another aspect includes generating a cryptographic checksum for metadata relating to said data object, the metadata comprising the retention date. Another aspect includes storing said metadata and said cryptographic checksum. Another aspect includes, based on receiving a request to perform a deletion transaction on said data object for deleting said data object from the storage system: verifying metadata validity by checking the cryptographic checksum for the metadata associated with said data object to detect possible tampering of the metadata; verifying retention expiration by determining that a current date is past the retention date comprised in said metadata; and based on successful verification of metadata validity and retention expiration, authorizing deletion of said data object by the storage system Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which:

FIG. 4 schematically illustrates an embodiment of initialization and storage operations in retention management; and FIG. 5 schematically illustrates an embodiment of a deletion operation in retention management.

DETAILED DESCRIPTION

Figure 1:
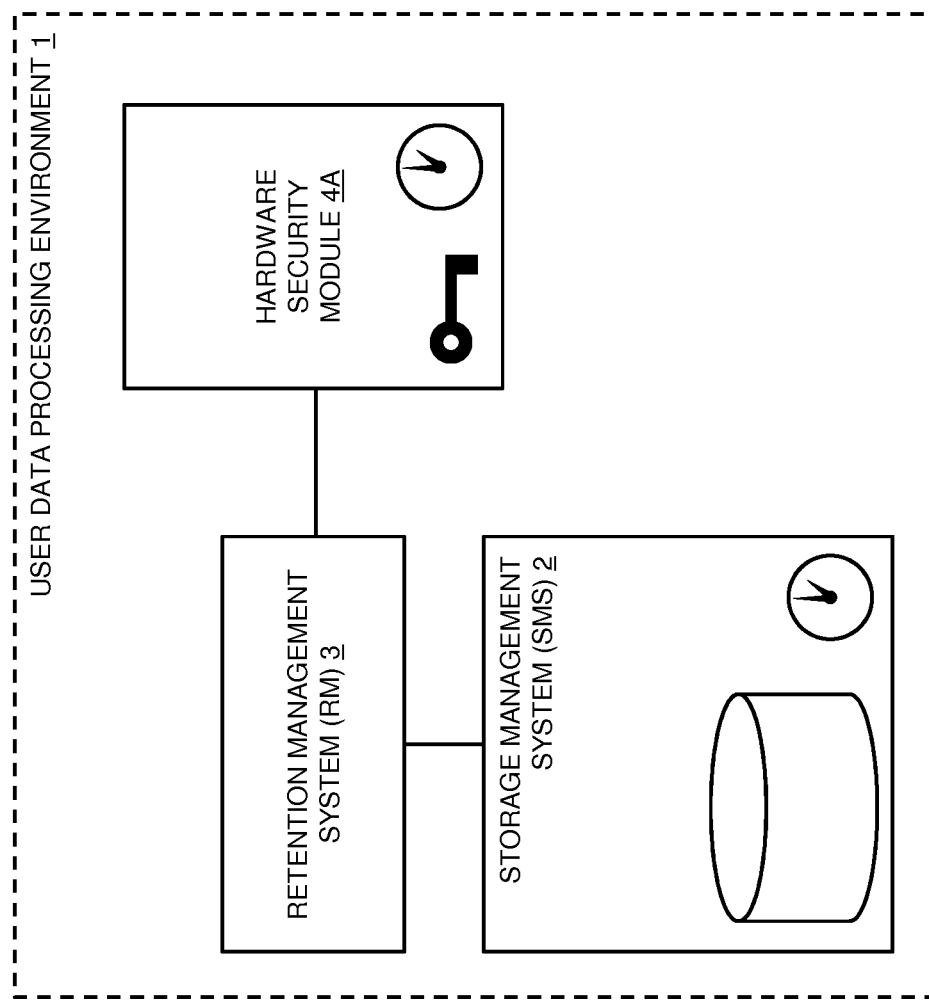
FIG. 1 schematically illustrates an embodiment of a retention management hardware architecture.

Embodiments disclosed herein relate to digital data retention management.

The term "storage system", as used herein, shall extend to any physical device allowing retrieval of formerly stored data as, for example, EPROM, EEPROM, PROM, DVD-RAM, DVD±RW, CD-RW, Flash Memory, SSD (Solid State Devices), HDD (Hard Disk Drives), Magnetic Tapes, DAT (Digital Audio Tape), MO (Magneto Optical Devices), Mini Disc™.

The terms "cloud" and "cloud-based" as used herein shall relate to a particular type of storage system and to particular operational methods for storage systems, namely to means and methods for remote and/or shared data access in computer networks according to the NIST Definition of Cloud Computing.

The term "trusted component", as used herein, shall have a relative meaning of a device, part of a device or computing environment providing a different and under at least one aspect increased level of trust than another device, part of a device or computing environment. A trusted component may be, for example, a hardware security module, an external validation system or an access control component as being defined below.

The term "hardware security module", as used herein, shall extend to any physical computing device that safeguards and manages digital keys for strong authentication and provides cryptoprocessing without revealing decrypted data. In particular, the term hardware security modules shall include FIPS 140-1 and 140-2 certified products. Hardware security modules may come in the form of a plug-in card or an external security device that can be attached directly to a server or general purpose computer through a network or universal serial bus (USB) connection. A hardware security module may contain one or more secure cryptoprocessor chips to prevent tampering and bus probing. Hardware security modules may be also deployed in the form of network hardware security modules to manage transparent data encryption keys associated with some databases.

The term "external validation system", as used herein, shall extend to a particular implementation of a trusted component wherein higher trust level is achieved by relocation of security-relevant functions from the user accessible computing environment to an external computing environment having restricted user access authorization. An external validation system may be, for example, a commonly known Trust Center or a Certification Authority.

The term "access control component", as used herein, may be understood as a computing instance intermediary between a cloud-based storage and an external validation system in a private computing environment. The access control component principal function is to provide authentication, authorization and data integrity in message exchange. Additionally, more advanced features as, for example, monitoring, auditing and data logging functionality may be provided by an access control component.

The term "data object", as used herein, shall encompass any kind of finite digital data which may be serve as plain-text or cipher-text in an encryption/decryption operation as, for example, portions of streams, files and serialized objects.

The term "metadata", as used herein, shall encompass any data related to properties of a data object regardless whether derivable from its contents or not. In particular, the term "metadata" may relate to a hash or digest of the contents of the data object as well as to additional data relating, for example, to the policy for handling the document.

The term "cryptographic checksum", as used herein, shall encompass any method of deriving a cryptographic secure fixed length data based on the contents of a data object. In particular, the term shall relate to digital signatures or content digests calculated on the basis of a secret key or initialization vector, respectively.

The term "retention date", as used herein, shall have the meaning of data encoding a date or a combined date-time value as the end of the lifetime period of a digital storage representation of a real-world document.

In an embodiment, digital data retention management comprises a method for operating a storage system, a retention management system and a trusted component, the storage system being configured for storing data objects and metadata associated thereto, the retention management system being operable for data processing, the trusted component being operable for providing access to a secure date and/or time basis and for performing cryptographic operations by using internally stored secret data, the method comprising: calculating a retention date associated with a data object in the storage system; generating a cryptographic checksum for metadata relating to the data object in said trusted component, the metadata comprising the retention date; storing said metadata and said cryptographic checksum in said storage system; based on receiving a request to perform a deletion transaction on said data object for deleting said data object from the storage system: verifying metadata validity by checking the stored cryptographic checksum to be a valid cryptographic checksum for the stored metadata associated with said data object to thereby detect possible tampering of the stored metadata; verifying retention expiration by checking the current date taken derived from a secure time basis by said trusted component to be past the retention date comprised in said metadata; and if verification of metadata validity and retention expiration has been successful, authorizing deletion of said data object by the storage system by sending the storage system a deletion authorization code generated in said trusted component as confirmation to delete said data object.

Embodiments may be implemented for retention management in distributed hardware architecture which comprises components operating on different levels of trust. In an embodiment the cryptographic checksum is generated as hash value or message digests of an aggregation of the metadata and additional secret data. In another embodiment the cryptographic checksum being generated in the way of digitally signing the metadata based on a secret key. In another embodiment, based on receiving said request to perform said deletion transaction, as an additional upstream validation the retention date is checked to be past the date taken from an internal clock of the storage system. This may reduce impact of client side attacks as, for example, denial-of-service attacks.

In another embodiment, in a recurring operation, for a data object stored in said storage system said retention date is compared to a date taken from an internal clock of the storage system and a request to perform a deletion operation on the respective data object is issued when the internal clock date is found to be past the retention date. In another embodiment, the deletion authorization code is appended to an audit log for later reference. This may discover fraudulent deletion of data objects in bypassing the validation authorization scheme by fraudulent users or system administrators. In another embodiment, the audit log is built-up in the structure of a signed hash-chain. This may help to prevent malicious users or system administrators from tampering with the audit log by, for example deleting log entries or adding invalid or faked log entries. In another embodiment, as part of a transaction of storing a data object in the storage system, transaction specific data is appended to a storage log. This may be advantageous for extended data object inventory tracking on the storage system. In another embodiment, the retention date is calculated based on stored retention policy templates and/or a secure clock. In another embodiment, the cryptographic checksum associated with the metadata is comprised in said request to perform a deletion transaction on said data object. In another embodiment, the retention date is embedded in the metadata.

In an embodiment, digital data retention management comprises a data processing and storage apparatus comprising a storage system, a retention management system and a trusted component, said storage system being configured for storing data objects and metadata associated thereto, said retention management system being operable for data processing, said trusted component being operable for providing access to a secure date and/or time basis and for performing cryptographic operations by using internally stored secret data, said data processing and storage apparatus being configured for: calculating a retention date associated with a data object in said storage system; generating a cryptographic checksum for metadata relating to said data object, the metadata comprising the retention date; storing said metadata along with said cryptographic checksum in said storage system; based on receiving a request to perform a deletion transaction on said data object for deleting said data object from the storage system: checking the cryptographic checksum for the metadata associated with said data object to detect possible tampering of the metadata; checking the current date taken derived from a secure date/time basis by said trusted component to be past the retention date comprised in said metadata; and if successful, authorizing deletion of said data object by the storage system by sending the storage system a deletion authorization code generated in said trusted component as confirmation to delete said data object.

In an embodiment, the trusted component internally stores secret data suitable to generate the cryptographic checksum as hash value or message digests of an aggregation of the metadata and a portion of said secret data. In another embodiment, the trusted component internally stores a number of keys suitable to perform cryptographic checksum calculation in the way of generation of a digital signature using a symmetric or asymmetric cryptographic algorithm. In another embodiment, the data processing and storage apparatus is configured for appending said deletion authorization code to an audit log for later reference. In another embodiment, the audit log is stored in a secured and/or tamper proof storage environment. In another embodiment, the data processing and storage apparatus is configured to adjust the secure clock by performing a secure synchronization protocol with a secured master time service. In another embodiment, the secure synchronization protocol is the Network Time Protocol (NTP). In another embodiment, the trusted component is an external validation system separate from said storage system and/or said retention management system.

In another embodiment, the external validation system is separated from the storage management system and/or the retention management system by one or more measures selected from: physical isolation, network isolation, e.g. by means of a firewall and/or a virtual private network, data encryption, separation of identities, e.g. by means of different domains, namespaces and/or operating processes, permissions and access control, e.g. authorization policies and/or access control lists. This may avoid that a compromised storage management system and/or retention management system can be used as a basis for attacking the external validation system.

In another embodiment, the external validation system is a security component. This may advantageously allow keeping of the external validation system according to premises of a customer. In another embodiment, the trusted component is operating at the highest trust level and/or in the trust domain having the highest trust level. In another embodiment, the storage management system and the retention management system are operating in untrusted domains. In another embodiment, the storage management system and the retention management system are integrated with each other. In another embodiment, the storage management system and the retention management system are operating on different trust levels and/or in different trust domains. In another embodiment, the trusted component is a hardware security module. In another embodiment, the hardware security module comprises internal storage for storing secret data. In another embodiment, the hardware security module comprises a redundant high precision clock to be used as the secure date/time basis. In another embodiment, the storage system is a cloud-based remote storage. In another embodiment, the cloud-based remote storage comprises the retention management system. In another embodiment, said cloud-based remote storage is connected to the trusted component via an access control component.

In another embodiment, the access control component is trusted to perform authentication and/or authorization. In another embodiment, the access control is configured to provide monitoring, auditing and data logging functionality.

In another embodiment, the access control component is configured for filtering requests according to operation permissions. In a more specific embodiment, the access control component is configured to confirm operating permissions before forwarding a request for retention validation to the trusted component. In another embodiment, the access control component is configured for performing additional monitoring and/or logging functions. In another embodiment, the access control component is configured to be managed and/or operated separately from the storage management system and/or retention management system. This may be helpful to overcome a number of typical security flaws in strongly interconnected systems.

In another embodiment, digital data retention management comprises a computer readable non-transitory storage medium comprising computer readable instructions which, when executed by a processor perform the method steps summarized before.

Figure 2:
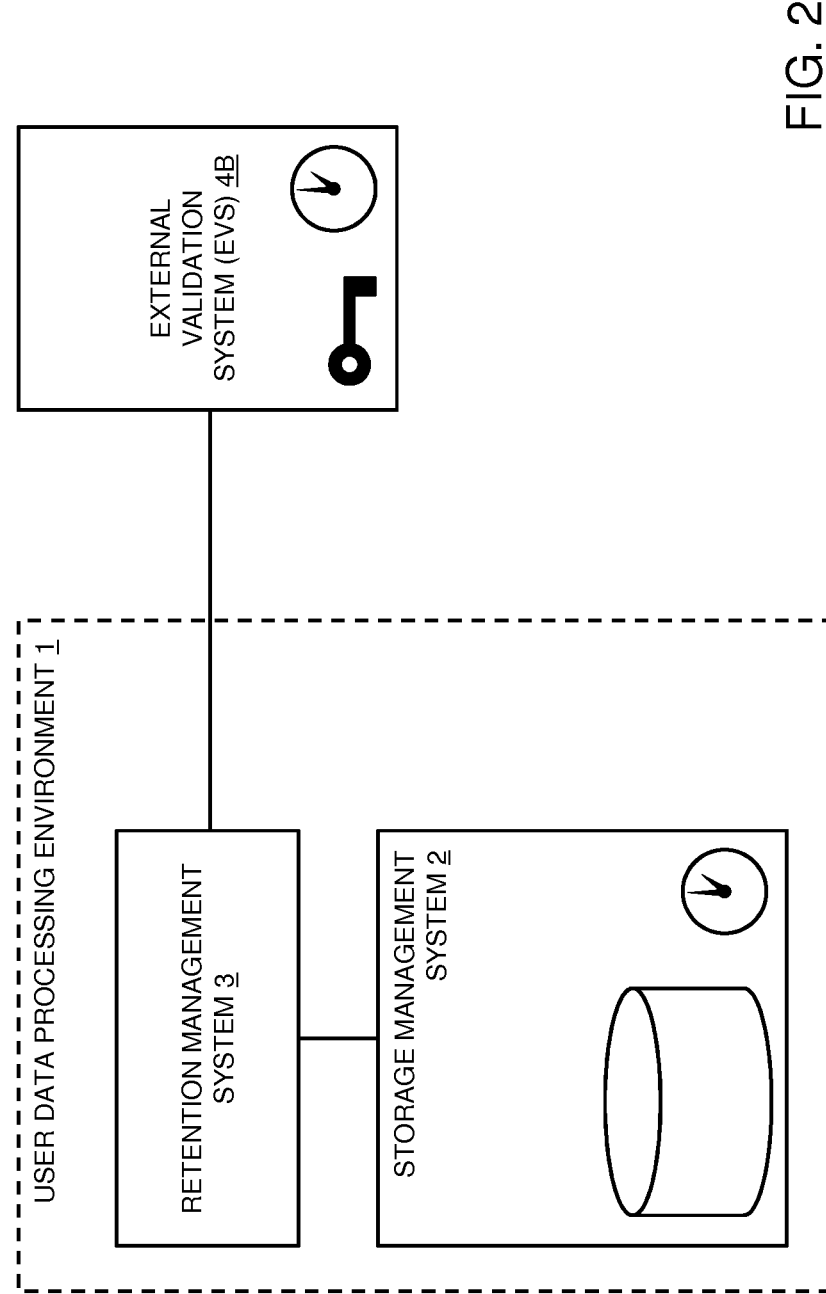
FIG. 2 schematically illustrates an embodiment of a retention management hardware architecture.
Figure 3:
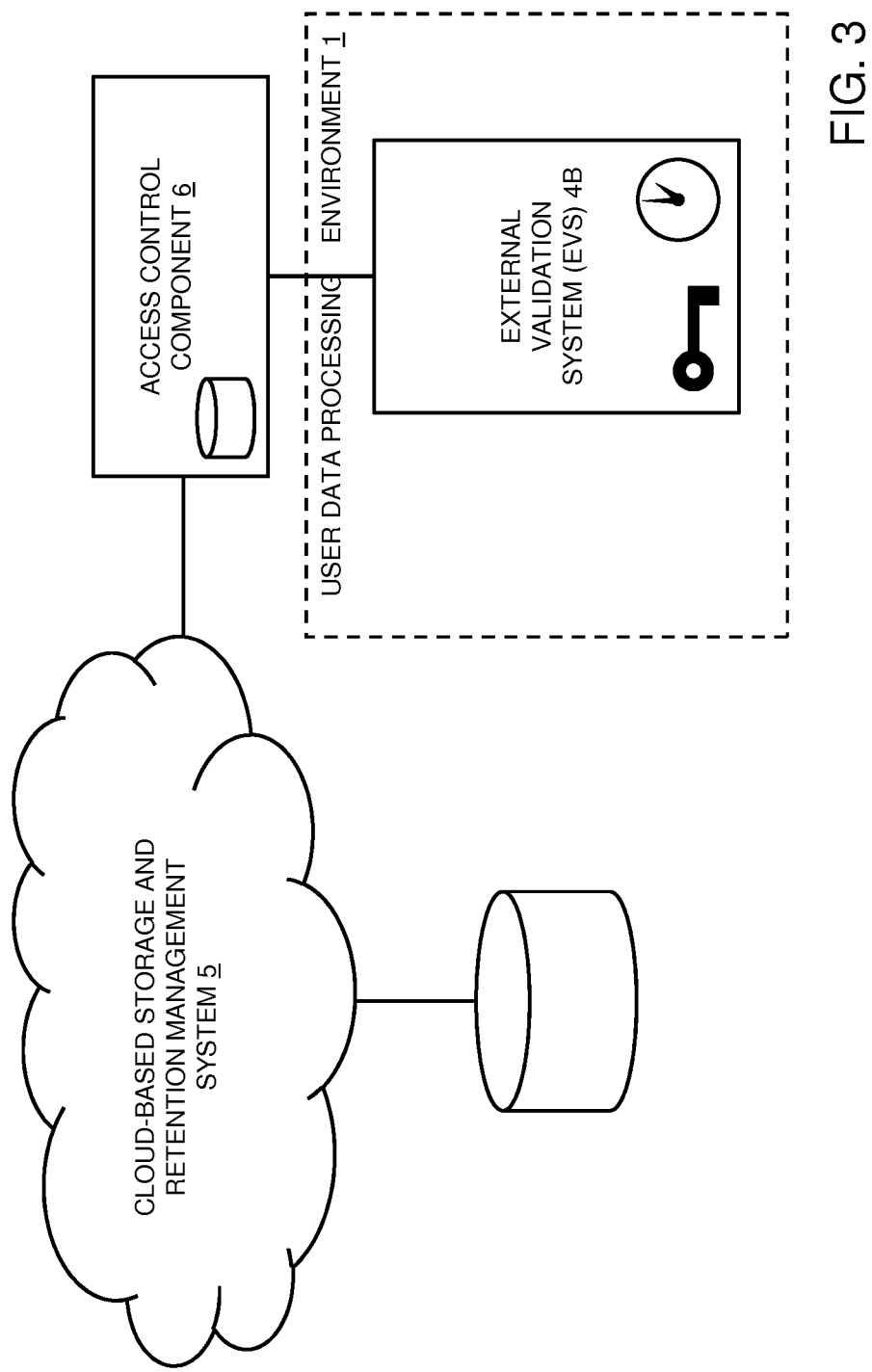
FIG. 3 schematically illustrates an embodiment of a retention management hardware architecture.

The use of a trusted component as, for example a hardware security module or an external validation systems, provides an economic security enhancement in digital data retention management. This may disable typical approaches for bypassing a retention policy as, for example, tampering with stored retention dates by direct manipulation and advancing system date/time basis. Digital data retention management may be realized in different methods on basis of a variety of hardware platforms. Three commonly used hardware architectures suitable for digital data retention management are shown in FIGS. 1 to 3. Embodiments of methods will be explained with reference to FIGS. 4 and 5.

FIG. 1 schematically illustrates a kind of island-like system as a first example of hardware architecture for digital data retention management. As indicated by the broken box, all system components belong to the user data processing environment 1. As shown, the hardware architecture may comprise a storage system 2 for storing data objects and portions of metadata associated thereto. In instances, the storage system 2 may be understood as managed or manageable disk storage equipment or the like. In a more detailed example, the storage system 2 may comprise an internal system clock and/or calendar as a date/time basis.

In instances, a retention management system 3 may be connected to the storage system 2. Typically, the retention management system 3 may be configured to process incoming storage requests for storage of data objects in the storage system 2. In an example, the retention management system 3 may be chosen as interface/filter to the storage system thereby processing all incoming storage requests regardless whether the underlying data object is subject to a retention policy or not. Then, the retention management system 3 may be configured to directly forward storage requests which are not subject to a retention policy directly and unchanged to the storage system 2. In such situation, storage requests for storage of objects which are subject to retention policy may be advantageously processed in the retention management system 3. In course of such processing, the retention management system may, for example, determine the specific retention policy to be applied to the respective data object and calculate the end of the retention period accordingly.

In instances, a hardware security module 4*a* may be connected to the retention management system 3 for providing services and functions of a trusted component. In a more detailed example, the hardware security module 4*a* may be configured to provide for a tamperproof encapsulation of date/time services and/or cryptographic functions as, for example, digital signing of data. Data/time services provided by the hardware security module 4*a* to the retention management system 3 may be derived from an internal high precision clock integrated with the hardware security module 4a. Once synchronized, the high-precision clock may serve as a stable and reliable time/calendar base for a long time period. Additionally, means for periodic synchronization of the high precision clock may be comprised in the hardware security module 4a, as for example a network interface suitable to perform synchronization via the Network Time Protocol (NTP) or a receiver for receiving synchronization radio clock data.

FIG. 2 schematically illustrates as a second example a network based hardware architecture for digital data retention management. The system components belonging to the user data processing environment, namely the storage system and the retention management system, may be configured to provide functions similar to the corresponding system components in the first example as described with reference to FIG. 1.

As shown and in difference to the first example, the trusted component may be an external validation system 4b located outside the user data processing environment at a remote hosting location, for example. This mainly corresponds to situations, when trust services are "bought-in" from an external provider. In instances, this may help to avoid costs due to amortization and operation of trusted hardware in the user data processing environment.

In instances, the external validation system 4b may provide services for accessing trusted date and/or time basis and performing cryptographic operations as, for example, secure hashing and digital signing of digital data. For this sake, the external validation system may comprise an internal clock/calendar as shown in the example. As an alternative, the external validation system may be configured to forward requests to another system or provider.

FIG. 3 schematically illustrates as a third example of a cloud-based hardware architecture for digital data retention management. As shown, a cloud-based storage and retention management system 5 may be connected to an external validation system 4b via an access control component 6. In instances, the cloud-based storage and retention management system 5 may integrate functions of storage management and retention management as indicated. In some situations, the a cloud-based storage and retention management system 5 may be operated by a third party at a lower level of trust than required by the user's retention policy and provided by the external validation system in the user environment. Then, the access control component 6 may be configured to compensate therefore. In a more detailed example, the access control component 6 may provide for authentication and/or authorization in data exchange between the cloud-based storage and retention management system 5 and the external validation system 4b, similar to a commonly known TrustCenter.

In instances, the access control component 6 may comprise transaction logging and/or auditing functionality. In a more detailed example, the access control component 6 may be configured to store relevant data upon forwarded requests for transactions. Such solicitor-like logging may become useful in cases when compliance with the specific retention policy is doubted.

FIG. 4 schematically illustrates an embodiment of a storage operation in digital data retention management on hardware architecture identical or similar as described before with reference to FIGS. 1 to 3. The scheme may be read similar to an interaction/sequence diagram in unified modeling language (UML). Accordingly, time evolution is top-down.

In the situation as shown, before processing of any storage requests is started, the trusted component 4a or 4b may perform an initialization procedure 41. In instances, the initialization procedure may comprise synchronization of an internal high-precision time/date basis as explained before. Further, the initialization procedure may comprise generation of a cryptographic key pair suitable for generation and verification of digital signatures in an asymmetric cryptographic scheme. An asymmetric cryptographic scheme may be used in some embodiments. As commonly known, secure digital signing may also be performed by use of symmetric algorithms as long as the underlying key is kept secret. This, however, requires the validation of the digital signature to be performed in the same environment where signing was made. This restriction may be understood as a disadvantage when a large amount of validation has to be performed thereby leading to a bottleneck situation in the trusted component.

After initialization, the digital data retention management system 3 may be in a state ready to receive storage requests 42 for storing data objects. The storage requests may be generated outside the digital data retention management system in a client application, by example, and may be sent to the retention management system 3. In instances, based on receiving a request for storage, the retention management system 3 may create a storable representation of the data object and may calculate a retention period using data relating to the data object to be stored. These data may be, in instances, derived from the contents of the data object or may be provided with the request for storage by an external source system. In a more detailed example, the retention management system 3 may create metadata associated to the data object. In some embodiments, the metadata may comprise the date/time denoting the end of the retention period calculated before.

In instances, the retention management system 3 passes control to the trusted component for adding a digital signature to the metadata 45 in order to allow verification of metadata validity at a later time. As shown, the digital signature may be passed back to the retention management system 3 before being stored together with the data object and the metadata by the storage system in a subsequent operation 46.

In a more detailed example, an audit log entry generated in trusted component 4a or 4b may be stored in the storage system 2. In instances, the audit log entry may comprise the metadata associated with the data object along with the digital signature. In a more detailed example, the audit log may be built-up in the way of a hash-chain of separate log entries whereby each audit log entry may comprise a cryptographically secure hash-value of the preceding audit log entry. As a commonly known measure, the hash-value to be stored in the first audit log entry may be calculated from secret data to prevent a malicious user from making a fraudulently modified hash-chain appearing valid. Typically, the secret initialization value may be stored in a tamperproof environment as, for example, an internal storage of the trusted component 4a or 4b. Additionally, the hash-value of the last audit log entry may be stored in the same way to prevent a malicious user from undetectably removing audit log entries from the end of the hash-chain.

In a more advanced operational example, storage of the audit log entry may be linked to storage of the data object and the metadata associated thereto in the understanding of a transaction. Then, the presence of an audit log entry may imply presence of the data object and associated metadata and vice-versa.

FIG. 5 schematically illustrates an embodiment of a deletion operation in digital data retention management on hardware architecture identical or similar as described before with reference to FIGS. 1 to 3.

In an example as shown, a deletion request 51 may be received by the retention management system 3 from an outside source as, for example, from a client application. The deletion request 51 may relate to a single data object or to a number of data objects in the storage system 2. In a specific example, data objects to be deleted may be identified by unique names, path or sub pathnames or any kind of unique identifiers encoded with the deletion request.

In another example, the deletion request may be forwarded directly to the storage system 2. Based on receiving the deletion request, the storage system 2 extracts the retention dates from metadata associated with the data objects to be deleted according to the deletion request and compares each retention date to a date derived from a local system time 52. When a retention date is detected to be in future, the respective identifier of the data object may be removed from the deletion request as an upstream plausibility check.

Afterwards, the storage system 2 may retrieve the metadata associated with the data objects to be deleted along with the respective digital signatures from the storage and may send these data to the trusted component 4a or 4b for validation. Based on receiving metadata and digital signatures, the trusted component may, for example, verify validity of the metadata signature 53. If successful, the trusted component may further extract the retention date from the metadata for comparing the retention date to a date taken from a trusted date/time basis 54. If the retention date is found to be in the past, the trusted component may create an additional authorization code for authorizing deletion of the respective data object 55. In instances, the authorization code may comprise the identifier of the respective data object. In a more detailed example, the authorization code may be digitally signed for allowing the storage system to perform a validation before deleting the data object.

In such situation, use of an asymmetric cryptographic scheme for generating digital signatures in the trusted component may be advantageous as the validity of the authorization code may be checked by the storage system 2 by using a public verification key. Then, another interaction or data exchange with the trusted component 4a or 4b would not be required.

In response of receiving the authorization code, the storage system may, in instances, append a respective audit log entry to the hash-chain 56. The audit log entry may, for example, comprise the authorization code and an identifier of the data object to be thereby authorized for deletion. Afterwards, the storage system 2 may perform a deletion operation on the data object and metadata associated therewith 57.

Again, a more elaborated realization may link the operation of adding an audit log entry to the hash-chain and the deletion operation together in the meaning of a transaction. Then, the presence of an audit log entry may imply a deletion of the respective data object and associated metadata.

In instances, the audit log entries relating to storage and deletion of data objects may be append to separate hash-chains in order to provide for enhanced security respective to tampering or fraudulent deletion. In hardware architecture according to FIG. 3, the audit log entries may be additionally or alternatively stored in the access control component 6 to provide for enhanced security.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method for operating a storage system, a retention management system and a trusted component, said storage system being configured for storing data objects and metadata associated thereto, said retention management system being operable for data processing, said trusted component being operable for providing access to a secure date or time basis and for performing cryptographic operations by using internally stored secret data, said method comprising:
   generating a cryptographic key pair in said trusted component, the cryptographic key pair is generated in an asymmetric cryptographic scheme;
   receiving a storage request by the retention management system associated with a data object;
   calculating a retention date associated with a data object in said retention management system and associating said data object with metadata comprising the retention data;
   generating a digital signature for said metadata in said trusted component utilizing the cryptographic key pair;
   storing said metadata and said digital signature; and
   based on receiving a request to perform a deletion transaction on said data object for deleting said data object from the storage system:
      verifying metadata validity by checking the digital signature for the metadata associated with said data object to detect possible tampering of the metadata;
      verifying retention expiration by determining that a current date is past the retention date comprised in said metadata; and
      based on successful verification of metadata validity and retention expiration, authorizing deletion of said data object by the storage system.

2. The method according to claim 1, wherein the current date is derived from a secure time basis by said trusted component, and wherein, based on receiving said request to perform said deletion transaction, as an additional upstream validation it is determined that the retention date is past a date taken from an internal clock of the storage system.

3. The method according to claim 1, wherein, in a recurring operation, for a data object stored in said storage system, said retention date is compared to a date taken from an internal clock of the storage system and a request to perform a deletion operation on the respective data object is issued when a date derived from the internal clock is found to be past the retention date.

4. The method according to claim 1, wherein authorizing deletion of said data object by the storage system is performed by sending the storage system a deletion authorization code generated in said trusted component as confirmation to delete said data object, and wherein said deletion authorization code is appended to an audit log for later reference, said audit log being built-up in a structure of a signed hash-chain.

5. The method according to claim 1, wherein, as part of a transaction of storing a data object in said storage system, transaction specific data is appended to a storage log.

6. The method according to claim 1, wherein said metadata and said digital signature are stored in said storage system.

7. A data processing and storage apparatus comprising:
   a storage system, said storage system being configured for storing data objects and metadata associated thereto;
   a retention management system, said retention management system being operable for data processing; and
   a trusted component, said trusted component being operable for providing access to a secure date or time basis and for performing cryptographic operations by using internally stored secret data, said data processing and storage apparatus being configured for:

generating a cryptographic key pair in said trusted component, the cryptographic key pair is generated in an asymmetric cryptographic scheme;
receiving a storage request by the retention management system associated with a data object;
calculating a retention date associated with a data object in said retention management system and associating said data object with metadata comprising the retention data;
generating a digital signature for said metadata in said trusted component utilizing the cryptographic key pair;
storing said metadata and said digital signature; and
based on receiving a request to perform a deletion transaction on said data object for deleting said data object from the storage system:
  verifying metadata validity by checking the digital signature for the metadata associated with said data object to detect possible tampering of the metadata;
  verifying retention expiration by determining that a current date is past the retention date comprised in said metadata; and
  based on successful verification of metadata validity and retention expiration, authorizing deletion of said data object by the storage system.

8. The data processing and storage apparatus according to claim 7, further configured for appending said deletion authorization code to an audit log for later reference, said audit log being stored in a secured or tamper proof storage environment.

9. The data processing and storage apparatus according to claim 7, further configured to adjust said secure clock by performing a secure synchronization protocol with a secured master time service.

10. The data processing and storage apparatus according to claim 7, wherein the secure synchronization protocol is a Network Time Protocol (NTP).

11. The data processing and storage apparatus according to claim 7, where said trusted component is an external validation system separate from said storage system and said retention management system.

12. The data processing and storage apparatus according to claim 7, said trusted component being a hardware security module.

13. The data processing and storage apparatus according to claim 11, said hardware security module comprising a high precision clock to be used as the secure date/time basis.

14. The data processing and storage apparatus according to claim 7, said storage system being a cloud-based remote storage.

15. The data processing and storage apparatus according to claim 14, said cloud-based remote storage being connected to the trusted component via an access control component, said access control component being configured for performing additional monitoring, logging, or auditing functions.

16. A computer program product for operating a storage system, a retention management system and a trusted component, said storage system being configured for storing data objects and metadata associated thereto, said retention management system being operable for data processing, said trusted component being operable for providing access to a secure date or time basis and for performing cryptographic operations by using internally stored secret data, the computer program product comprising a computer readable storage medium having program instructions embodied therewith, the program instructions executable by a processing circuit to cause the processing circuit to:
generating a cryptographic key pair in said trusted component, the cryptographic key pair is generated in an asymmetric cryptographic scheme;
receiving a storage request by the retention management system associated with a data object;
calculating a retention date associated with a data object in said retention management system and associating said data object with metadata comprising the retention data;
generating a digital signature for said metadata in said trusted component utilizing the cryptographic key pair;
storing said metadata and said digital signature; and
based on receiving a request to perform a deletion transaction on said data object for deleting said data object from the storage system:
  verifying metadata validity by checking the digital signature for the metadata associated with said data object to detect possible tampering of the metadata;
  verifying retention expiration by determining that a current date is past the retention date comprised in said metadata; and
  based on successful verification of metadata validity and retention expiration, authorizing deletion of said data object by the storage system.

17. The computer program product according to claim 16, wherein the current date is derived from a secure time basis by said trusted component, and wherein, based on receiving said request to perform said deletion transaction, as an additional upstream validation it is determined that the retention date is past a date taken from an internal clock of the storage system.

18. The computer program product according to claim 16, wherein, in a recurring operation, for a data object stored in said storage system, said retention date is compared to a date taken from an internal clock of the storage system and a request to perform a deletion operation on the respective data object is issued when a date derived from the internal clock is found to be past the retention date.

19. The computer program product according to claim 16, wherein authorizing deletion of said data object by the storage system is performed by sending the storage system a deletion authorization code generated in said trusted component as confirmation to delete said data object, and wherein said deletion authorization code is appended to an audit log for later reference, said audit log being built-up in a structure of a signed hash-chain.

20. The computer program product according to claim 16, wherein, as part of a transaction of storing a data object in said storage system, transaction specific data is appended to a storage log.

* * * * *